(12) United States Patent
Crockett et al.

(10) Patent No.: US 12,421,991 B2
(45) Date of Patent: Sep. 23, 2025

(54) SEALING HEAD DESIGN FOR SELF-PENETRATING AND HOLE FORMING FASTENERS

(71) Applicant: Semblex Corporation, Elmhurst, IL (US)

(72) Inventors: Stephen Crockett, Bartlett, IL (US); Brandt J. Ruszkiewicz, Glendale Heights, IL (US); Eric C. Breidenbaugh, Huntley, IL (US); John Grimsby, Carol Stream, IL (US); Chris Norton, Cheboygan, MI (US)

(73) Assignee: SEMBLEX CORPORATION, Elmhurst, IL (US)

( * ) Notice: Subject to any disclaimer, the term of this patent is extended or adjusted under 35 U.S.C. 154(b) by 55 days.

(21) Appl. No.: 18/126,114

(22) Filed: Mar. 24, 2023

(65) Prior Publication Data
US 2024/0159262 A1    May 16, 2024

Related U.S. Application Data

(60) Provisional application No. 63/383,096, filed on Nov. 10, 2022.

(51) Int. Cl.
*F16B 25/10* (2006.01)
*F16B 25/00* (2006.01)
(Continued)

(52) U.S. Cl.
CPC ........ *F16B 25/106* (2013.01); *F16B 25/0084* (2013.01); *F16B 29/00* (2013.01); *F16B 33/004* (2013.01)

(58) Field of Classification Search
CPC ... F16B 43/001; F16B 33/004; F16B 25/0021
(Continued)

(56) References Cited

U.S. PATENT DOCUMENTS 2,322,811 A * 6/1943 Ball .................. F16B 35/06
411/378
2,751,806 A * 6/1956 Dickie ............... B60K 15/0406
411/542
(Continued)

OTHER PUBLICATIONS

Ruszkiewicz, Brandt J., U.S. Appl. No. 17/975,239, filed Oct. 27, 2022.
(Continued)

*Primary Examiner* — Flemming Saether
(74) *Attorney, Agent, or Firm* — GREER BURNS & CRAIN, LTD.

(57) ABSTRACT

A fastener including an elongated shaft extending between first and second shaft ends, with a tip provided at the first shaft end, and a thread region provided between the tip and the second shaft end; and a head with a drive region arranged at the second shaft end. The fastener also incudes a first annular undercut area in an underside surface of the head, where the first annular undercut area is configured and arranged to receive material that has flowed from a substrate during installation of the fastener into the substrate, and a second annular undercut area in the underside surface of the head, where the second annular undercut area is located radially outwardly of the first annular undercut area. Additionally, an annular sealing member is provided within the second annular undercut area, where the annular sealing member makes sealing contact with an upper surface of the substrate.

22 Claims, 14 Drawing Sheets

(51) Int. Cl.
*F16B 29/00* (2006.01)
*F16B 33/00* (2006.01)

(58) Field of Classification Search
USPC .......................................................... 411/542
See application file for complete search history.

(56) References Cited

U.S. PATENT DOCUMENTS

| | | | | |
|---|---|---|---|---|
| 3,399,589 | A * | 9/1968 | Breed | F16B 33/004 |
| | | | | 411/428 |
| 3,592,100 | A * | 7/1971 | Mackiewicz | F16B 33/004 |
| | | | | 411/908 |
| 3,661,046 | A * | 5/1972 | Waud | F16B 25/0047 |
| | | | | 277/637 |
| 4,026,183 | A * | 5/1977 | Bart | F16B 43/001 |
| | | | | 411/542 |
| 4,875,818 | A * | 10/1989 | Reinwall | F16B 33/004 |
| | | | | 411/371.1 |
| 5,234,301 | A | 8/1993 | Grossberndt et al. | |
| 5,304,023 | A * | 4/1994 | Toback | F16B 33/004 |
| | | | | 411/387.3 |
| 7,581,913 | B2 * | 9/2009 | Ordonio, Jr. | F16B 37/14 |
| | | | | 411/533 |
| 9,175,708 | B2 | 11/2015 | Werthwein | |
| 10,598,205 | B2 | 3/2020 | Simpson et al. | |
| 11,174,892 | B2 * | 11/2021 | Chen | F16B 35/06 |
| 2003/0094769 | A1 * | 5/2003 | Tyroller | F16J 15/062 |
| | | | | 277/627 |
| 2007/0098520 | A1 * | 5/2007 | Schraer | F16B 35/06 |
| | | | | 411/179 |
| 2024/0167497 | A1 * | 5/2024 | Weckerle | F16B 25/103 |

OTHER PUBLICATIONS

Office Action issued by the Canadian Patent Office for corresponding Patent Application No. 3,217,689, mailed Mar. 3, 2025.

* cited by examiner

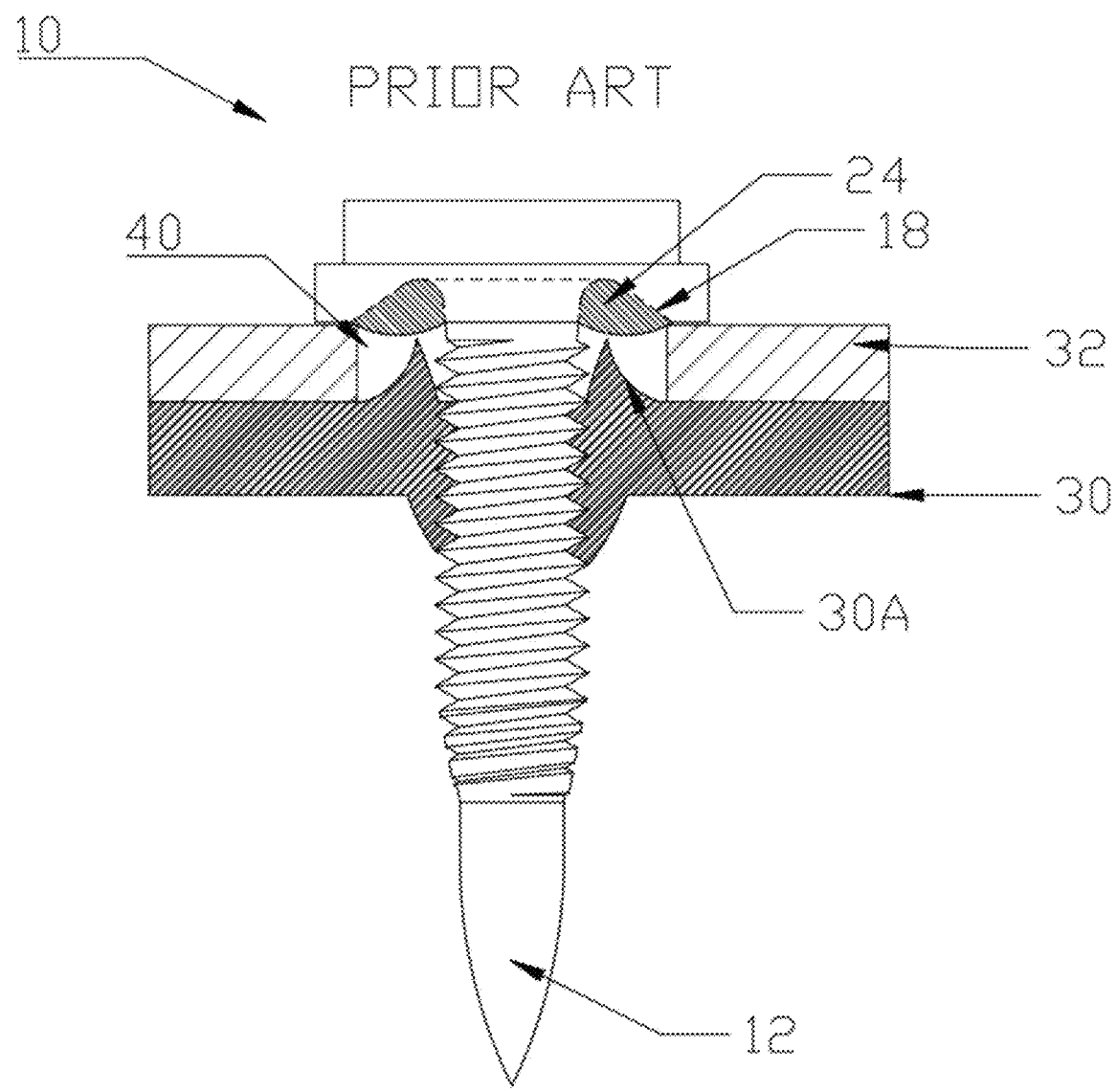

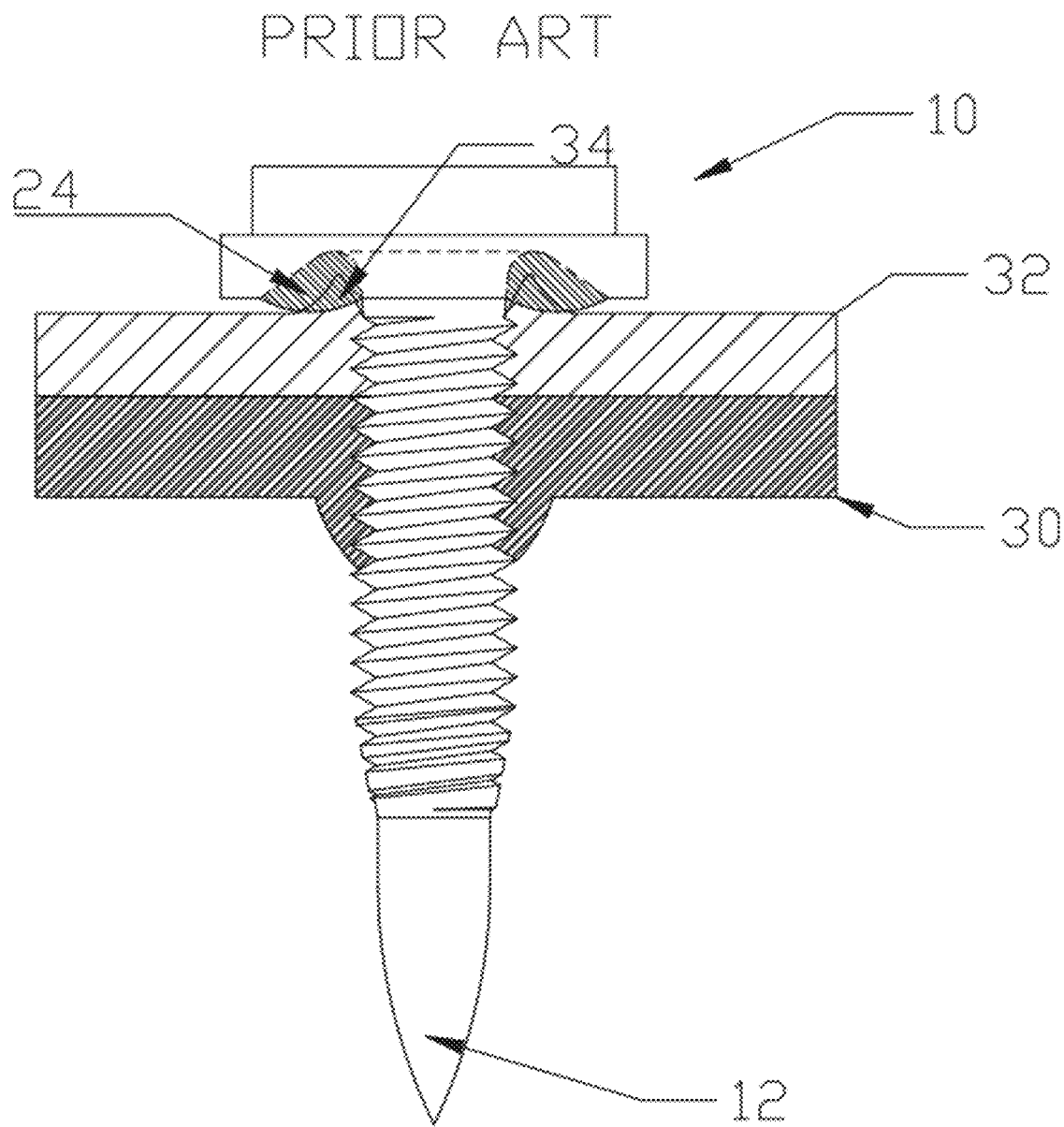

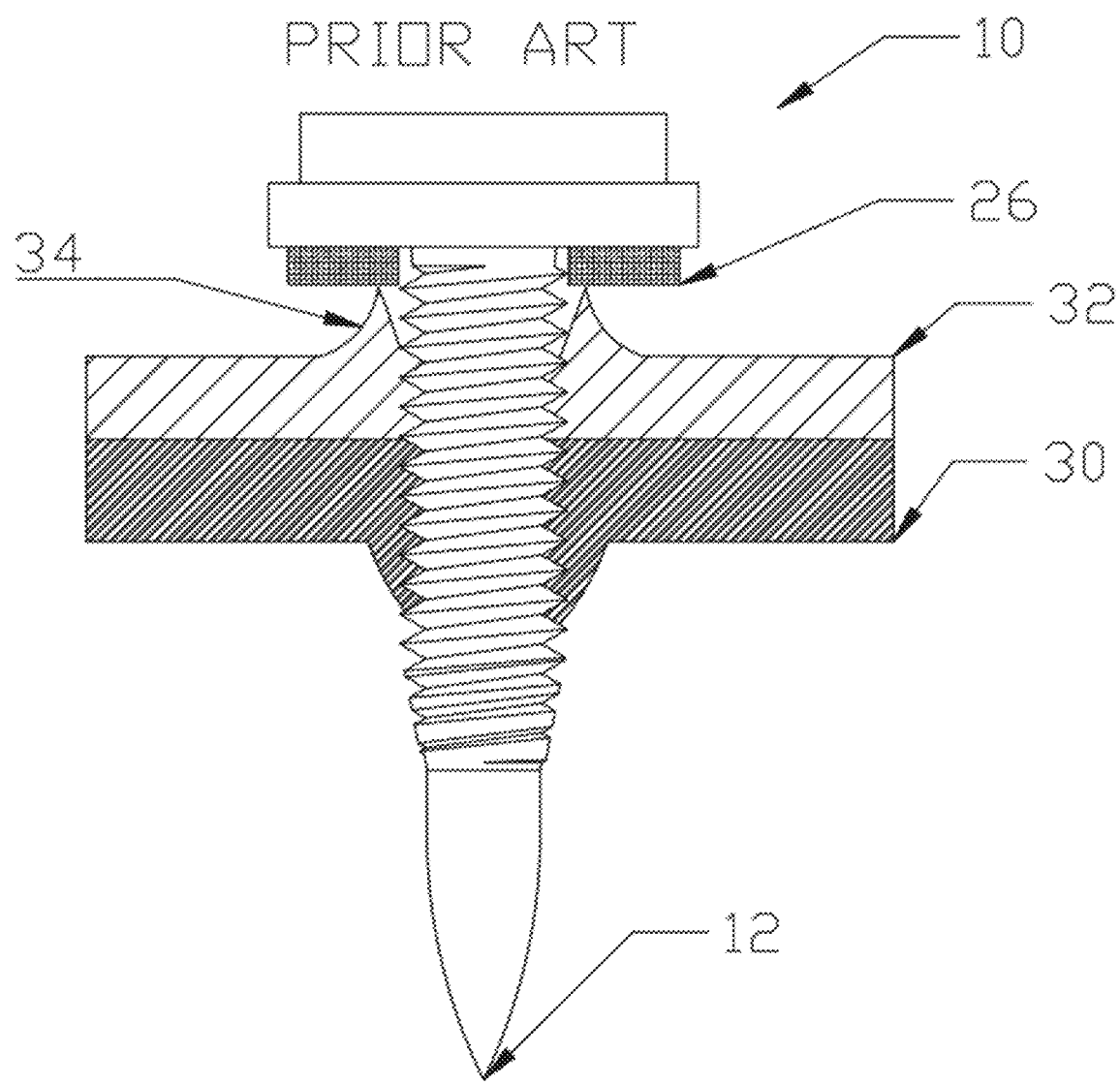

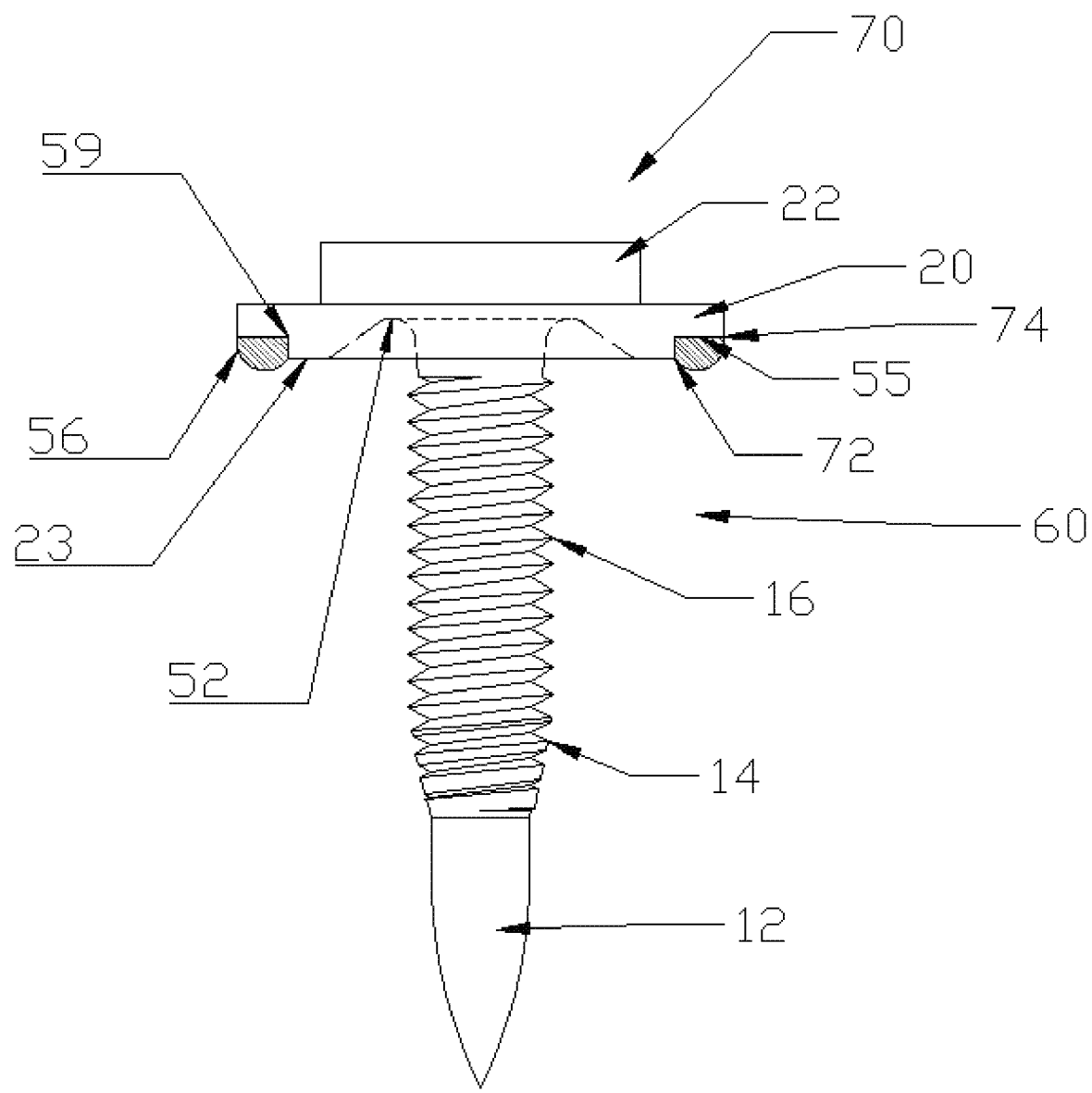

SEALING HEAD DESIGN FOR SELF-PENETRATING AND HOLE FORMING FASTENERS

Water sensitive assemblies such as battery boxes in electric vehicles require waterproofing to prevent water from interacting with critical electrical components housed within their assemblies. In the case of a battery box assembly, often the entire box must be watertight, including the areas where the fasteners used to hold the assembly together pass through the battery box. If water can get past the fasteners, it can often enter the assembly (depending on the design).

Flow hole forming or flow drilling fasteners, which are types of self-penetrating and thread forming fasteners, are often used in aluminum intensive or mixed material structures. The products such as those in U.S. Pat. Nos. 9,175,708 and 5,234,301 are examples of currently existing self-penetrating and thread forming fasteners. Other examples of such flow drilling fasteners are shown and described in U.S. patent application Ser. No. 17/975,239 and U.S. Pat. No. 10,598,205, both of which are hereby incorporated by reference in their entirety.

These types of fasteners create their own hole in the target substrate by generating heat through rotation speed and the end load applied to the fastener. This heat mixed with the point geometry, which is described in the previously mentioned patents, forces the material to move away from the screw, thereby creating a formed hole. Threads are then formed into the hole, followed by the fastener fully seating, resulting in a secure joint.

BRIEF DESCRIPTION OF THE DRAWINGS

FIG. 4A shows an example of a hole forming and thread forming fastener including a sealing material in an installed state in which the upper substrate layer includes a through hole therein to receive the upflowed material from the lower substrate layer;

FIG. 4B shows an example of a hole forming and thread forming fastener including a sealing material in an installed state in which the upper substrate layer lacks a through hole therein, and thus the upflowed material of the upper substrate layer displaces the sealing material;

FIG. 5B shows an example of a hole forming and thread forming fastener including a crush washer in an installed state in which the upper substrate layer lacks a through hole therein, and thus the upflowed material of the upper substrate layer displaces the crush washer;

FIG. 7A shows another example of an embodiment of the present invention of a hole forming and thread forming fastener that includes a first undercut area that is open and a second undercut area that includes a sealant therein where the first and second undercut areas are discontinuous, with an annular space therebetween;

DETAILED DESCRIPTION

Figure 1:
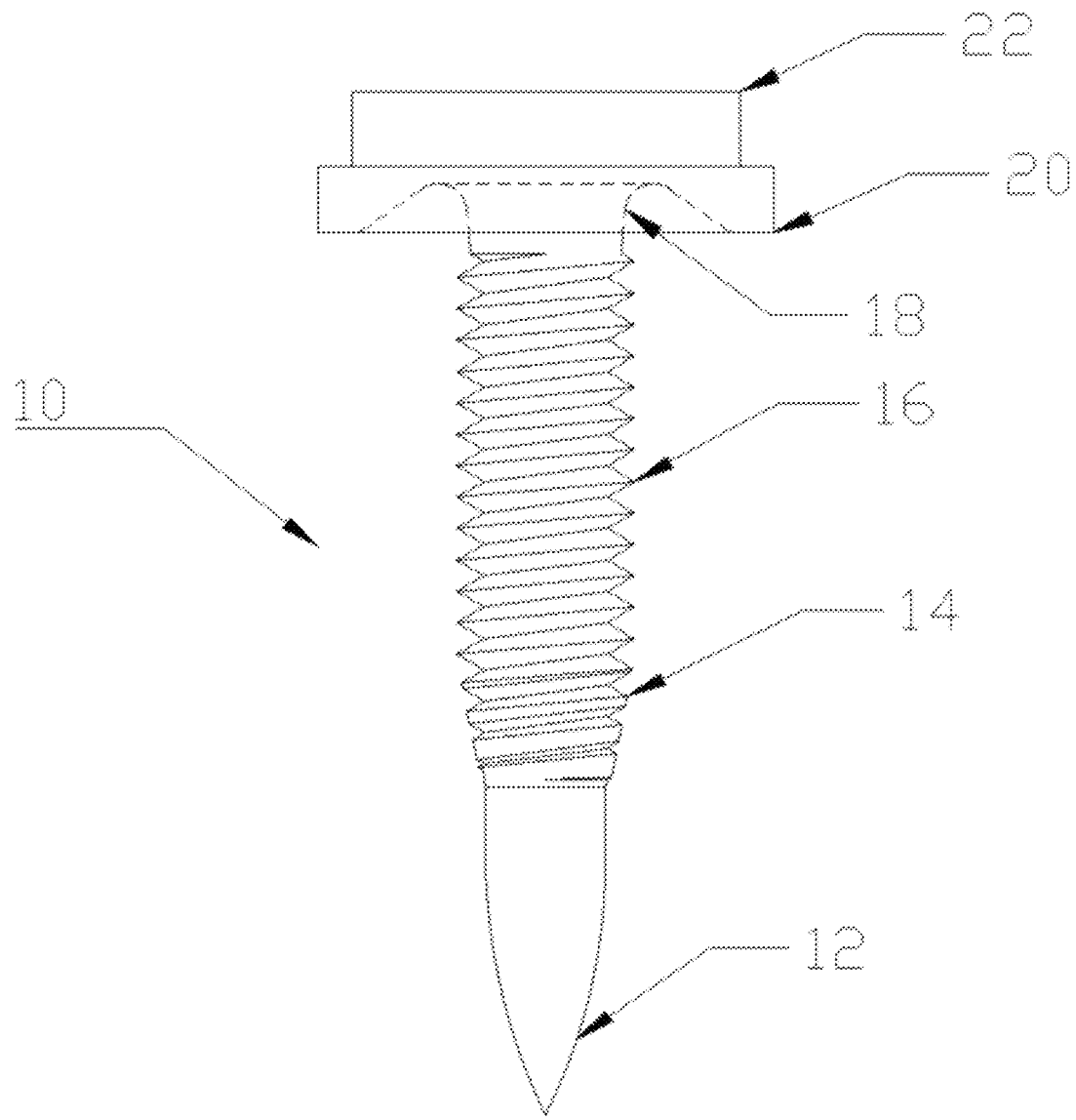
FIG. 1 is an example of hole forming and thread forming fastener.

Turning now to FIG. 1, shown is an example of a hole and thread forming fastener 10, which includes a hole forming point/tip 12, an optional tapered thread region 14 that facilitates the formation of the threads in a substrate, a full-sized thread region 16, an undercut area 18 formed under a fastener head 20 where the undercut area 18 has a single annular shape (such as described in U.S. Pat. No. 5,234,301), and a drive system on the end 22 of the head 20 of the fastener 10. The undercut area 18 is in the form of a cavity located under the head 20, and is designed to capture material from the substrate that moves towards the underside of the head 20 of the fastener 10 during the process of hole forming in a substrate. In general, a fastener 10 such as that shown in FIG. 1. is not self-sealing on its own.

Figure 2A:
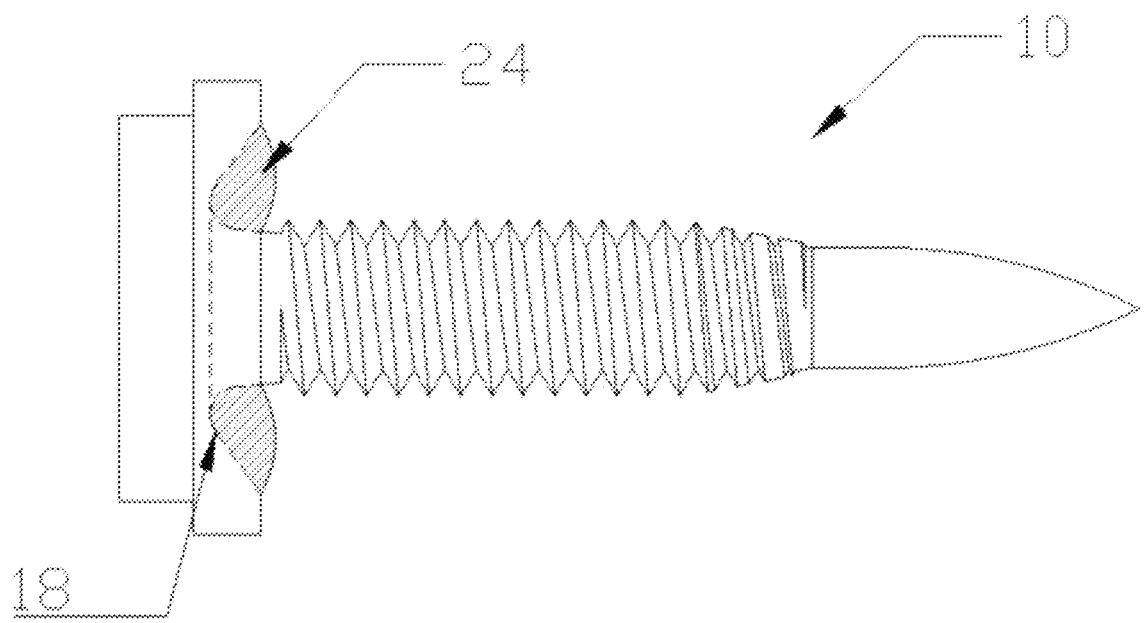
FIG. 2A is one example of a solution for providing a sealing feature for a hole forming and thread forming fastener.
Figure 2B:
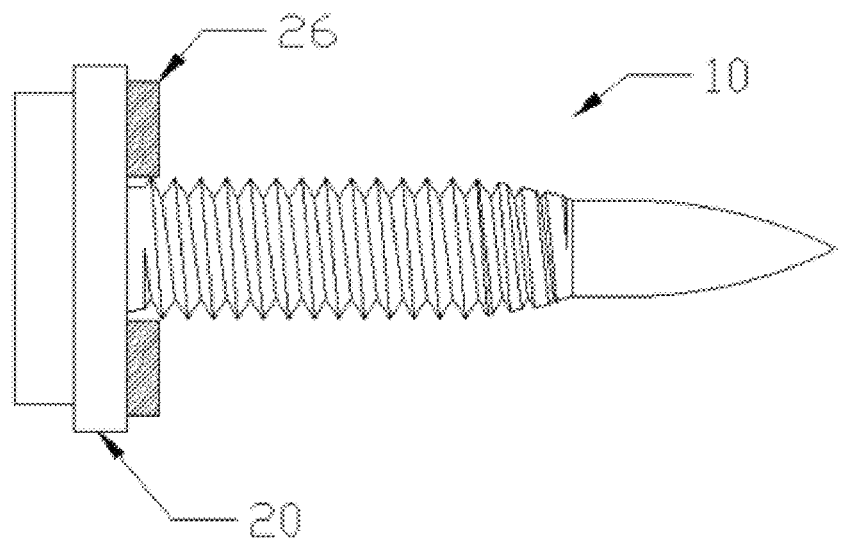
FIG. 2B is another example of a solution for providing a sealing feature for a hole forming and thread forming fastener.

Referring now to FIGS. 2A and 2B, two methods for creating a sealed joint with a self-penetrating and thread forming fastener 10 are shown and will be described. First, FIG. 2A shows how the undercut 18 is filled with a sealing material 24. Second, FIG. 2B shows a fastener 10 in which a crush washer 26 is provided on the underside of the head 20.

Figure 3:
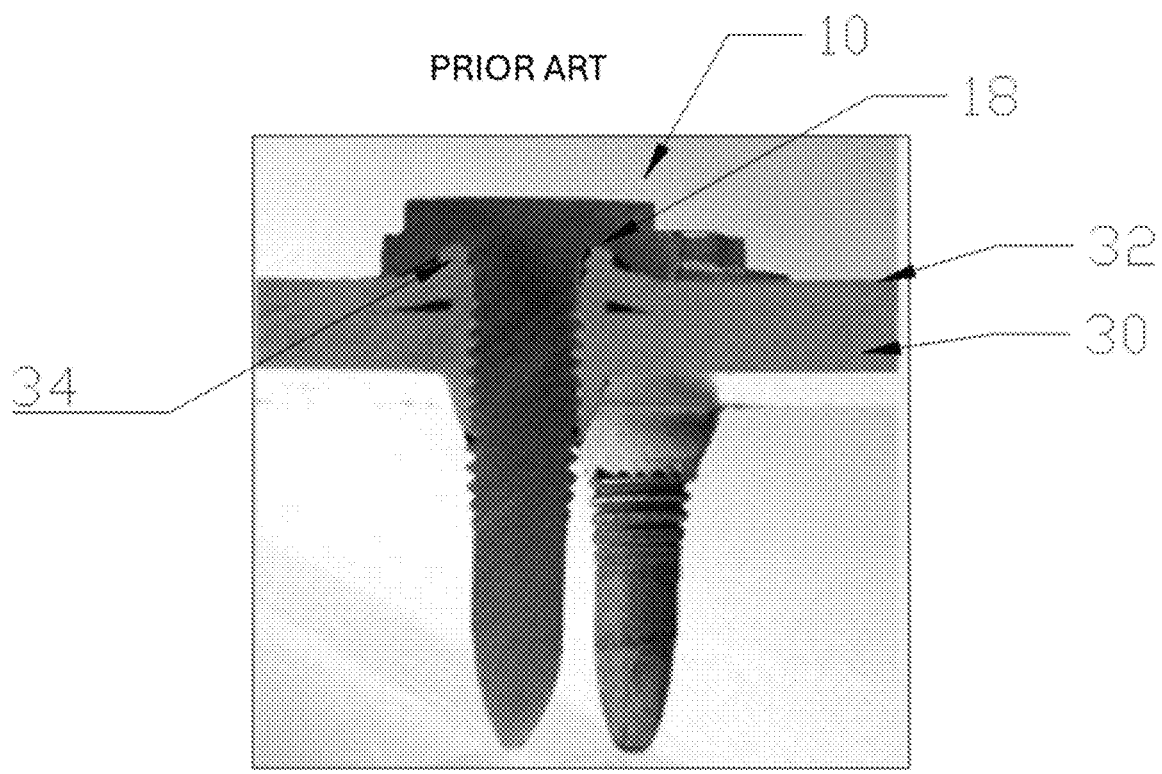
FIG. 3 is a representation of how material from the substrate upflows during the hole forming process.

Turning now to FIG. 3, this figure will be used to help explain the background of a common problem with a fastener such as that shown in FIG. 1. During the installation process of a fastener 10 of the type shown in FIG. 1, in the situation in which the fastener 10 is used to join two or more substrate layers together (such as an upper substrate layer 32 and a lower substrate layer 30), if the upper substrate layer 32 does not have a clearance hole in it, some of the material 34 of the upper substrate layer 32 will flow upwards towards the undercut 18 of the fastener 10. The undercut 18 on a non-sealing fastener (such as that depicted in FIG. 1) is designed to capture this material 34 as shown in the cross-section in FIG. 3.

However, if a sealing material (such as sealing material 24 of FIG. 2A) is present in the undercut 18, the sealing material 24 is removed by the upflowing material of the upper substrate layer, and thus an effective seal may not be formed. Similarly, in the case of a crush washer (such as crush washer 26 of FIG. 2B), the head of the fastener 10 cannot seat properly due to the upflowed material, and thus an effective seal may not be formed in this situation either.

To create an effective seal with a self-penetrating and thread forming fastener 10 of the type shown in FIG. 2A (with sealing material 24) or the type shown in FIG. 2B (with crush washer 26), a clearance hole can be provided in the topmost substrate layer. To illustrate the use of a clearance hole in combination with a self-penetrating and thread forming fastener with sealing material and in combination with a self-penetrating and thread forming fastener that includes a crush washer, FIGS. 4A, 4B, 5A and 5B will be discussed next.

FIG. 4A shows a situation in which a self-penetrating and thread forming fastener 10 of the type shown in FIG. 2A, which includes sealing material 24 in the undercut area 18, is used to join the upper substrate layer 32 with the lower substrate area 30, and where the upper substrate layer 32 includes a through hole 40 therein that was created prior to driving the fastener 10 into the substrates. When the clearance hole 40 is present, such as shown in FIG. 4A, the hole forming tip 12 does not contact the upper substrate layer 32, and thus no material moves or flows from the upper substrate layer 32. Further, the material 30A the flows from the lower substrate layer 30 is primarily contained within the clearance hole 40, and does not reach the undercut area 18 with the sealing material 24 therein. Accordingly, the sealing material 24 creates the desired seal.

In contrast, in a situation such as in FIG. 4B in which a clearance hole is lacking, the material 34 that flows from the upper substrate layer 32 while the fastener 10 is being driven tends to displace the sealing material 24, and thus the desired seal may not be created.

Figure 5A:
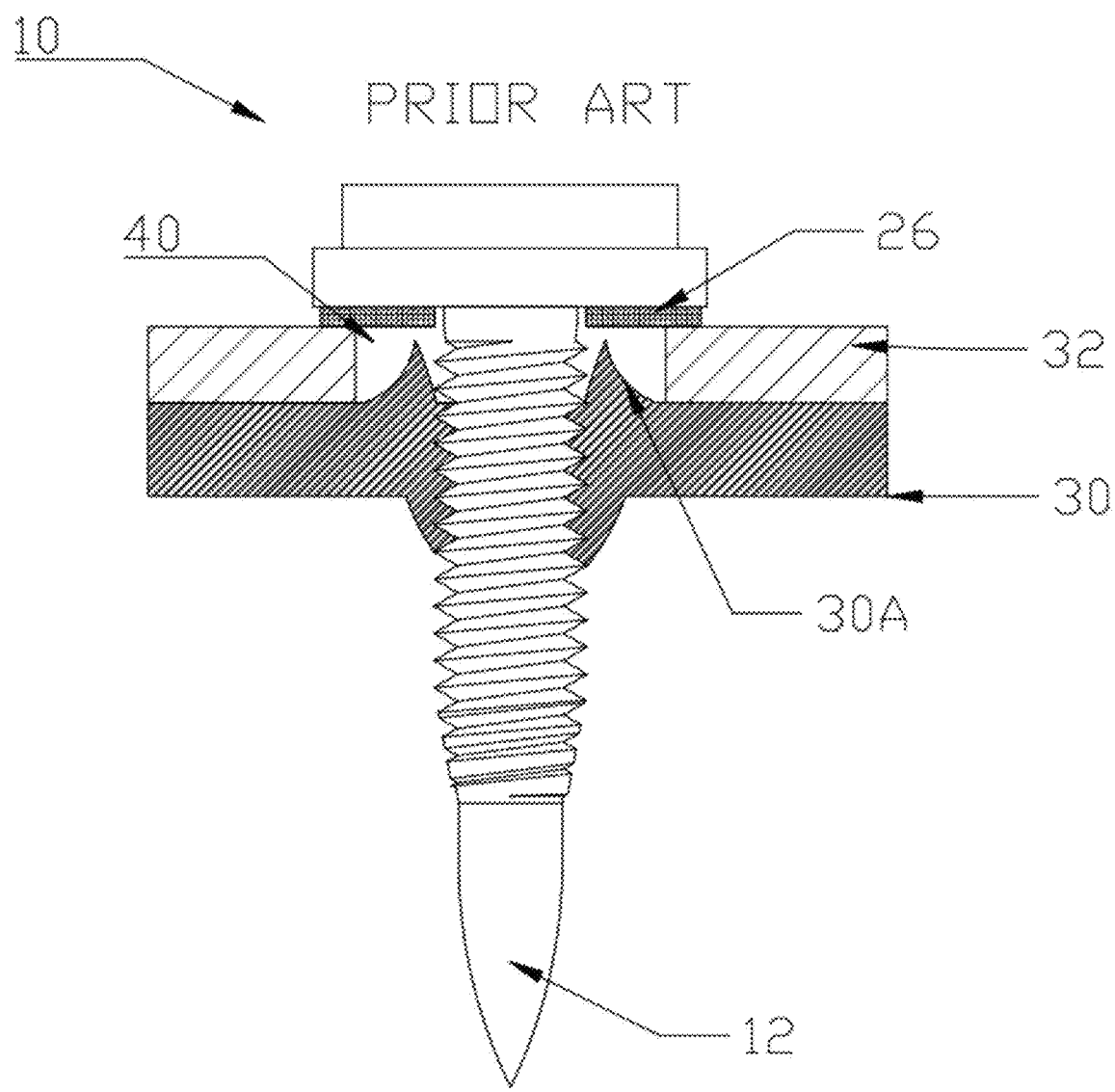
FIG. 5A shows an example of a hole forming and thread forming fastener including a crush washer in an installed state in which the upper substrate layer includes a through hole therein to receive the upflowed material from the lower substrate layer.

FIG. 5A shows a situation in which a self-penetrating and thread forming fastener 10 of the type shown in FIG. 2B (which includes a crush washer 26, and which lacks an undercut area 18) is used to join the upper substrate layer 32 with the lower substrate area 30, and where the upper substrate layer 32 includes a through hole 40 therein that was created prior to driving the fastener 10 into the substrates. As described above with regard to FIG. 4A, when the clearance hole 40 is present, such as shown in FIG. 5A, the hole forming tip 12 does not contact the upper substrate layer 32, and thus no material moves or flows from the upper substrate layer 32. Further, the material 30A the flows from the lower substrate layer 30 is primarily contained within the clearance hole 40, and does not reach the crush washer 26. Accordingly, the crush washer 26 properly seats on the upper surface of the upper substrate layer 32, and creates the desired seal.

In contrast, in a situation such as in FIG. 5B in which a clearance hole is lacking, the material 34 that flows from the upper substrate layer 32 while the fastener 10 is being driven tends to prevent the crush washer from properly seating on the upper surface of the displace the upper substrate layer 32, and thus the desired seal may not be created.

Figure 6A:
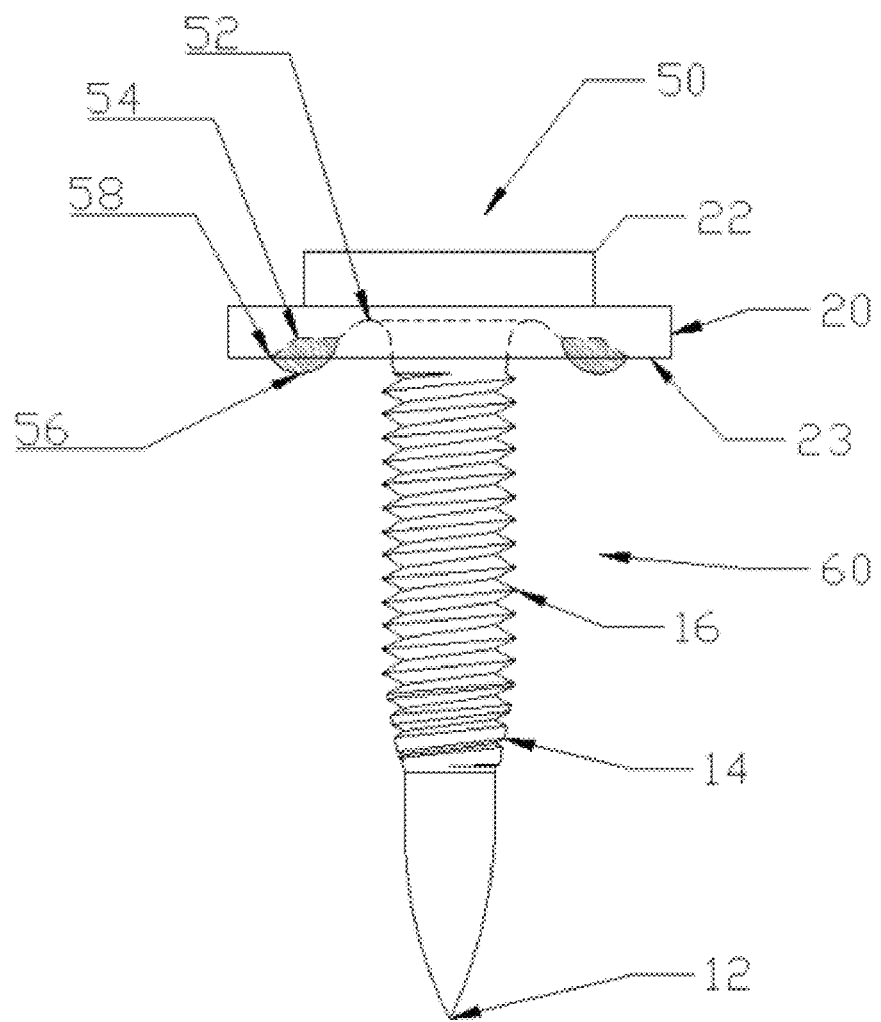
FIG. 6A shows an example of an embodiment of the present invention of a hole forming and thread forming fastener that includes a first undercut area that is open and a second undercut area that includes a sealant therein, where the first and second undercut areas are continuous, without an annular space therebetween.
Figure 7B:
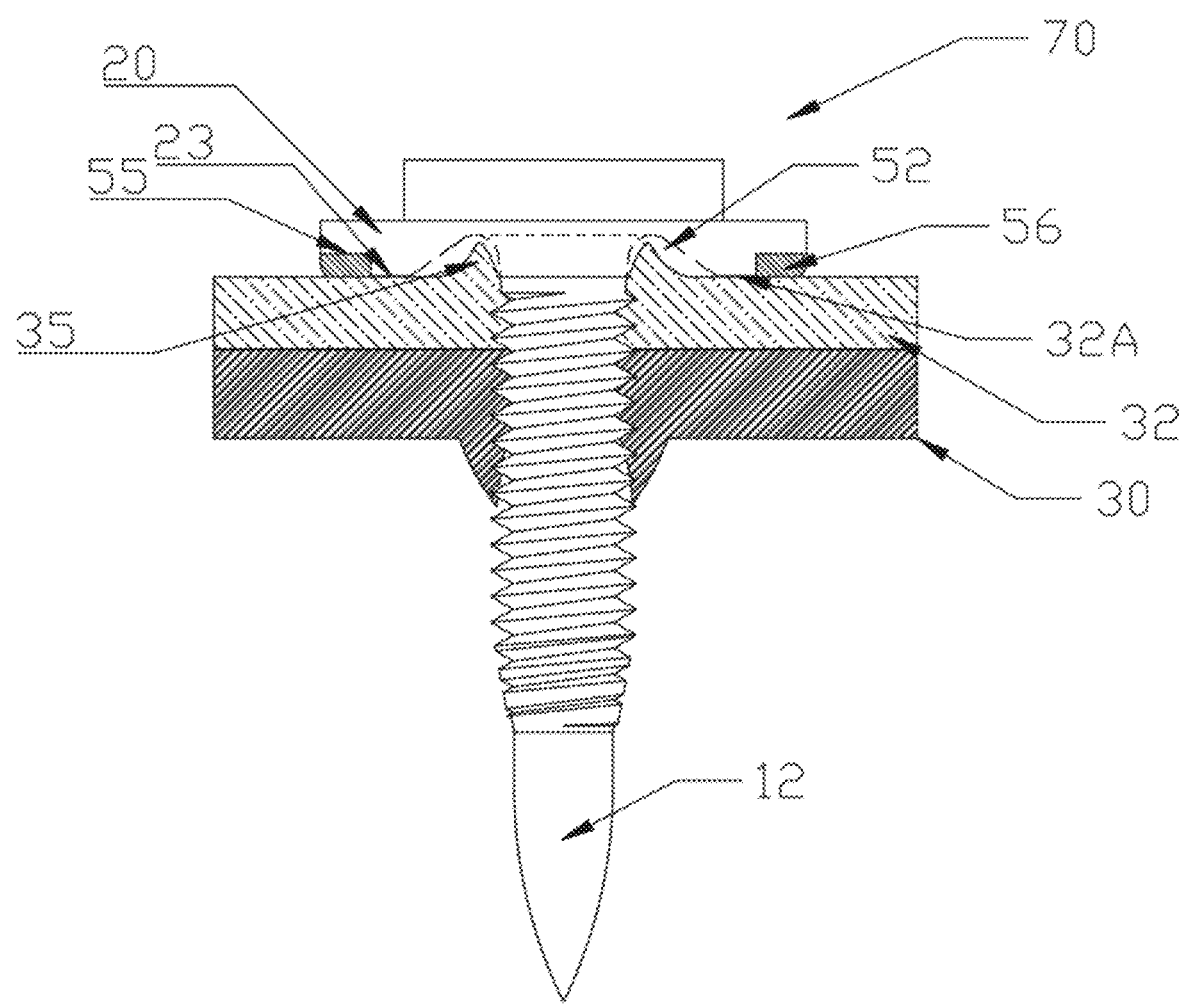
FIG. 7B shows the fastener of FIG. 7A in an installed state in which the upper substrate layer lacks a through hole therein, and in which the upflowed material of the upper substrate is received in the first undercut area, allowing the sealant of the second undercut area to form a proper seal with the upper surface of the upper substrate.
Figure 8A:
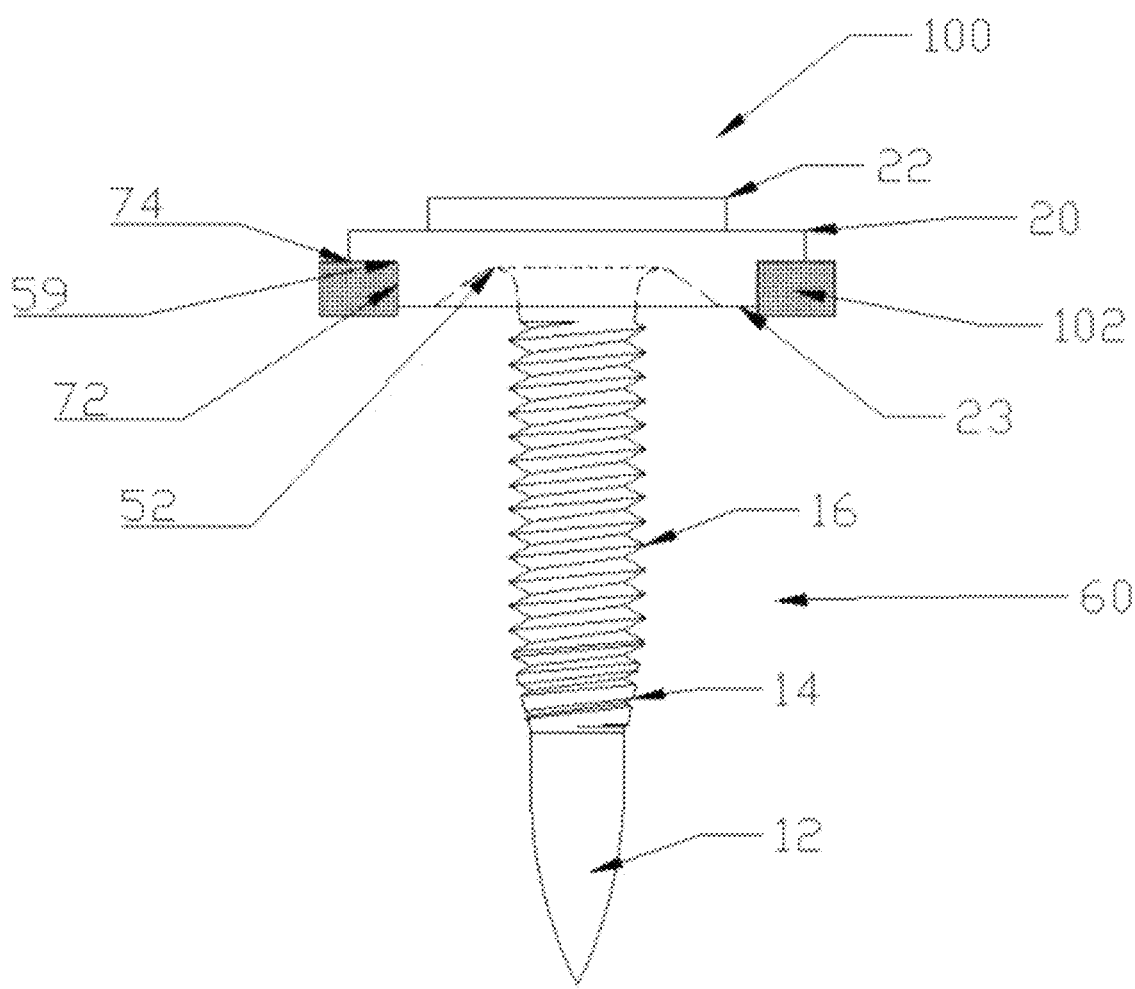
FIG. 8A shows another example of an embodiment of the present invention of a hole forming and thread forming fastener that includes a first undercut area that is open and a second undercut area that includes a crush washer or an O-ring therein where the first and second undercut areas are discontinuous, with an annular space therebetween.

Turning now to FIGS. 6A, 7A and 8A, various improvements to the previously discussed fasteners are shown and will be described. FIG. 6A shows an example of a self-penetrating and thread forming fastener 50. As with the fasteners 10 discussed earlier, fastener 50 includes a hole forming point/tip 12, an optional tapered thread region 14, a full-sized thread region 16 and a head 20 with a drive region 22. The drive region 22 is configured and arranged for receiving a rotary driving force to drive the fastener 50 into a single workpiece, or into a plurality of superposed workpieces. It is contemplated that the drive region may be any type of conventionally known drive arrangement (either an internal drive arrangement, such as slotted, Phillips, Torx, square, hex, socket, etc. or an external drive arrangement, such as hex, 12-point, line head, Torx, Torx Plus, etc.), or it may be a novel drive arrangement.

The tip 12 preferably includes a relatively sharp point at a longitudinal end thereof, and optionally includes a plurality of facets that extend upwardly in the longitudinal direction from the point. However, it is also contemplated that the tip 12 could include a blunt or somewhat rounded end, and that the facets could be omitted or be replaced with another configuration, such as a plurality of material deforming ribs, which could be used to facilitate the hole-forming process. In this embodiment, as well as in the other embodiments described herein, the tip 12 is configured and arranged to create a hole and threads by softening the material of a workpiece when the fastener is driven into the workpiece.

The embodiment of FIG. 6A includes a first undercut area 52, which will also be referred to as a primary undercut zone, and a second undercut area 54, which will also be referred to as a secondary undercut zone. Such as combination of a primary undercut zone and a secondary undercut zone will be referred to as a multiple zone undercut design.

The first undercut area 52 and the second undercut area 54 are both formed in the underside surface 23 of the head 20. The first undercut area 52 and the second undercut area 54 are each preferably the form of an annular groove formed around the shaft (or shank) 60 of the fastener 50. A sealant 56, such as a soft compressible resin sealant, is provided within the second undercut area 54. The sealant may be applied to the second undercut area 54 after the fastener has been formed. In this embodiment, the radially outermost edge 58 of the second undercut area 54 is preferably inclined with respect to the underside surface 23 of the head 20, and the outer peripheral portion of this underside surface 23 (i.e., the portion radially outward of the second undercut area 54) is preferably perpendicular to a line that defines the central longitudinal axis of the shaft 60. As can be seen in FIG. 6A, the annular groove that defines the first undercut area 52 is preferably deeper (i.e., extends further in the axial direction from the underside surface 23) than the annular groove that defines the second undercut area 54. Further, in this embodiment, the bases of the annular grooves that define the first and second undercut areas 52 and 54 are each preferably concavely curved, when considered in cross-section. However, it is also contemplated that the annular grooves may each include one or more flat portions, when considered in cross-section. Further, the volume of the first undercut area 52 is preferably larger than that of the second undercut area 54. Additionally, in this embodiment, the annular grooves of the first and second undercut areas 52 and 54 are preferably formed adjacent to each other in a continuous manner, without an annular gap between the radially outer edge of the annular groove of the first undercut area 52 and the radially inner edge of the annular groove of the second undercut area 54. As can be seen in FIG. 6A, the sealant 56 is in the form of an annular sealing member that extends axially downwardly beyond the underside surface 23 of the head 20 in a generally convex manner, in cross section.

Figure 6B:
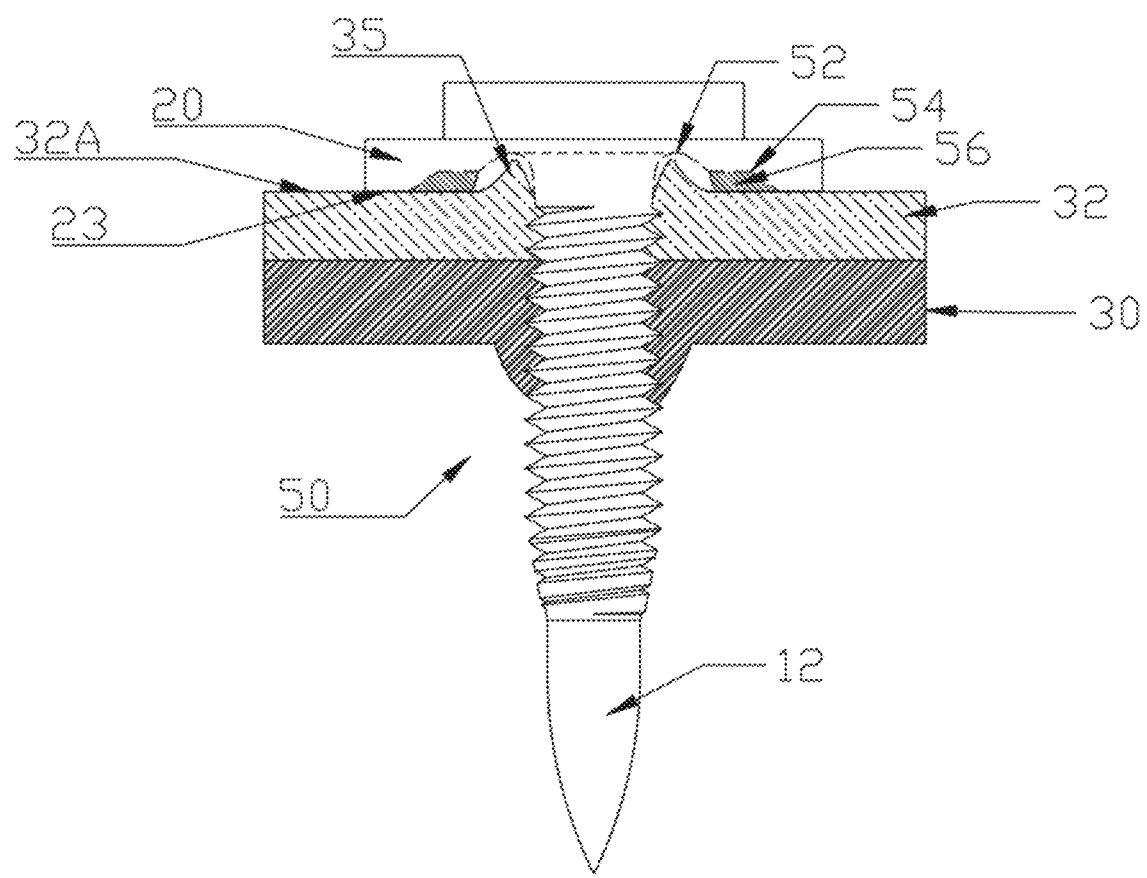
FIG. 6B shows the fastener of FIG. 6A in an installed state in which the upper substrate layer lacks a through hole therein, and in which the upflowed material of the upper substrate is received in the first undercut area, allowing the sealant of the second undercut area to form a proper seal with the upper surface of the upper substrate.

FIG. 6B shows the fastener 50 of FIG. 6A in an installed state in which the fastener 50 joins upper substrate layer 32 and lower substrate layer 30, and provides a waterproof seal around the threaded hole formed by the hole forming point/tip 12, all without the need for a through hole in the upper substrate layer 32. The method of installing the fastener 50 of this embodiment, as well as of the other embodiments disclosed herein, is described in U.S. Pat. No. 10,598,205, which is incorporated by reference in its entirety.

As can be seen in FIG. 6B, the material 35 of the upper substrate layer 32 has flowed into the first undercut area 52. However, since the sealant 56 in the second undercut area 54 is located radially outside of the first undercut area 52 (and radially outside of the flowed material 35), a proper seal can be made between the sealant 56, which is annular-shaped, and the upper surface 32A of the upper substrate layer 32 because the sealant 56, which is compressed between the second undercut area 54 and the upper surface 32A of the upper substrate layer 32, remains in place, with respect to the radial direction, within the second undercut area 54. This is the case because the first undercut area 52 has sufficient volume to accept the flowed material 35, and thus the flowed material 35 does not move the sealant 56 to a location where the sealant 56 fails to make proper sealing contact with the upper surface 32A of the upper substrate layer 32.

FIG. 7A shows another example of a self-penetrating and thread forming fastener 70 of the present invention. As with the fasteners 10 discussed earlier, fastener 70 includes a hole forming point/tip 12, an optional tapered thread region 14, a full-sized thread region 16 and a head 20 with a drive region 22.

The embodiment of FIG. 7A includes a first undercut area 52, which will also be referred to as a primary undercut zone, and a second undercut area 55, which will also be referred to as a secondary undercut zone. Such as combination of a primary undercut zone and a secondary undercut zone will again be referred to as a multiple zone undercut design.

The first undercut area 52 and the second undercut area 55 are both formed in the underside surface 23 of the head 20. The first undercut area 52 and the second undercut area 55 are each preferably in the form of an annular groove formed around the shaft 60 of the fastener 50. A sealant 56 is provided within the second undercut area 55. In this embodiment, the radially innermost edge 59 of the second undercut area 55 preferably defines a right angle between an axially extending annular wall 72 and a radially extending annular wall 74. Preferably, the radially extending annular wall 74 forms a plane that extends perpendicular to the axis of the shaft 60, and the axially extending annular wall 72 extends in a direction that is parallel to the shaft 60.

In the fastener 70 of the FIG. 7A embodiment, the annular groove that defines the first undercut area 52 is preferably deeper (i.e., extends further in the axial direction from the underside surface 23) than the annular recessed portion that defines the second undercut area 55. Further, in this embodiment, the base of the annular groove that defines the first undercut area 52 is preferably concavely curved, when considered in cross-section. However, it is also contemplated that the annular groove may include one or more flat portions, when considered in cross-section. Additionally, the volume of the first undercut area 52 is preferably larger than that of the second undercut area 55.

Additionally, in this embodiment, the annular groove of the first undercut area 52 and the annular recessed portion of the second undercut area 55 are preferably formed with an annular gap between the radially outer edge of the annular groove of the first undercut area 52 and the radially inner edge of the annular recessed portion of the second undercut area 55, and thus this embodiment is considered to have discontinuous undercut areas. As can be seen in FIG. 7A, the sealant 56 is in the form of an annular sealing member that extends radially downwardly beyond the underside surface 23 of the head 20 in a generally convex manner, in cross-section.

FIG. 7B shows the fastener 70 of FIG. 7A in an installed state in which the fastener 70 joins upper substrate layer 32 and lower substrate layer 30, and provides a waterproof seal around the threaded hole formed by the hole forming point/tip 12, all without the need for a through hole in the upper substrate layer 32. The method of installing the fastener 70 of this embodiment, as well as of the other embodiments disclosed herein, is described in U.S. Pat. No. 10,598,205, which is incorporated by reference in its entirety.

As can be seen in FIG. 7B, the material 35 of the upper substrate layer 32 has flowed into the first undercut area 52. However, since the sealant 56 in the second undercut area 55 is located radially outside of the first undercut area 52 (and radially outside of the flowed material 35), a proper seal can be made between the sealant 56, which is annular-shaped, and the upper surface 32A of the upper substrate layer 32 because the sealant 56, which is compressed between the second undercut area 55 and the upper surface 32A of the upper substrate layer 32, remains in place, with respect to the radial direction, within the second undercut area 55. This is the case because the first undercut area 52 has sufficient volume to accept the flowed material 35, and thus the flowed material 35 does not move the sealant 56 to a location where the sealant 56 fails to make proper sealing contact with the upper surface 32A of the upper substrate layer 32.

FIG. 8A shows another example of a self-penetrating and thread forming fastener 100 of the present invention. As with the fastener 10 discussed earlier, fastener 100 includes a hole forming point/tip 12, an optional tapered thread region 14, a full-sized thread region 16 and a head 20 with a drive region 22. The embodiment of FIG. 8A is very similar to the embodiment of FIG. 7A, except that in the FIG. 8 embodiment, an O-ring or a crush washer 102 is provided in place of the sealant 56 of FIG. 7A, where the O-ring or crush washer 102 acts as an annular sealing member. Features of the embodiment depicted in FIGS. 8A and 8B are the same as those described above with regard to the embodiment of FIGS. 7A and 7B, unless otherwise noted.

Figure 8B:
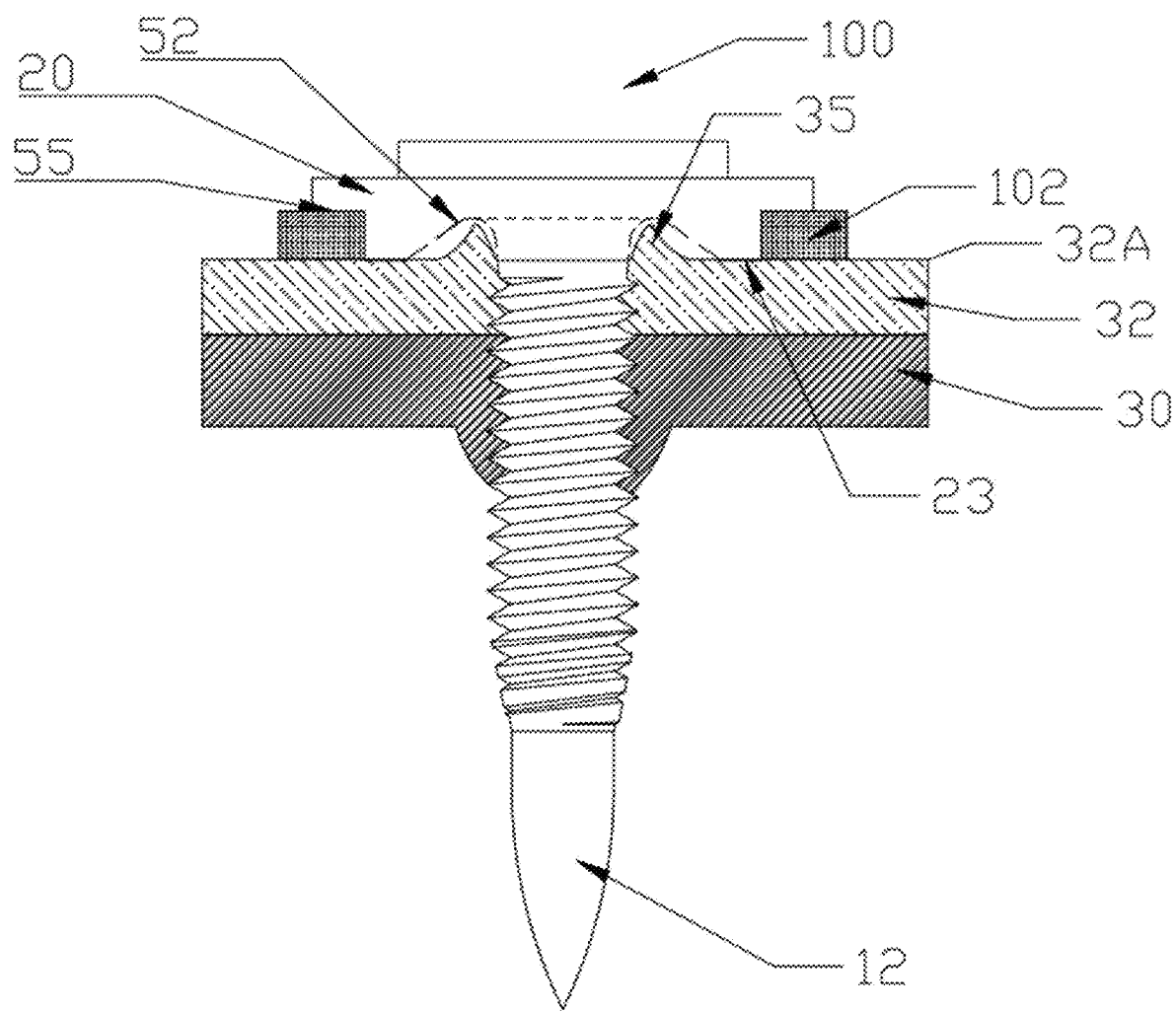
FIG. 8B shows the fastener of FIG. 8A in an installed state in which the upper substrate layer lacks a through hole therein, and in which the upflowed material of the upper substrate is received in the first undercut area, allowing the crush washer or O-ring of the second undercut area to form a proper seal with the upper surface of the upper substrate.

FIG. 8B shows the fastener 100 of FIG. 8A in an installed state in which the fastener 100 joins upper substrate layer 32 and lower substrate layer 30, and provides a waterproof seal around the threaded hole formed by the hole forming point/tip 12, all without the need for a through hole in the upper substrate layer 32.

As can be seen in FIG. 8B, the material 35 of the upper substrate layer 32 has flowed into the first undercut area 52. However, since the crush washer 102 (or O-ring) in the second undercut area 55 is located radially outside of the first undercut area 52 (and radially outside of the flowed material 35), a proper seal can be made between the member 102, which is annular-shaped, and the upper surface 32A of the upper substrate layer 32 because the member 102, which is compressed between the second undercut area 55 and the upper surface 32A of the upper substrate layer 32, remains in place, with respect to the radial direction, within the second undercut area 55. This is the case because the first undercut area 52 has sufficient volume to accept the flowed material 35, and thus the flowed material 35 does not move the member 102 to a location where it fails to make proper sealing contact with the upper surface 32A of the upper substrate layer 32.

In the embodiments of FIGS. 6A, 7A and 8A, any suitable materials can be used for the crush washers, the O-rings, and as a sealant. For example, for the crush washers, any desired soft metal or metal alloy, such as soft aluminum or copper alloy may be used, and for the O-rings, any of the following materials are suitable: Nitrile (Buna-N), Neoprene, Ethylene Propylene, PTFE, Fluorocarbon, among others, including various elastomeric materials, such as various natural or synthetic rubbers. Of course, the materials suitable for the crush washers and the O-rings are not limited to the examples provided herein. In certain embodiments, the crush washers and the O-rings are separate components that are formed independently of the fasteners, and then the crush washer or the O-ring is adhered to the fastener in a known manner.

Finally, as the material for the sealant, special materials that provide unique sealing and performance properties are preferably utilized, such as any suitable soft compressible resin sealant. For example, any of the following materials may be used: Rimlex 620, Rimlex 625, Precote 200, NySeal 2.0, or other commercially viable sealants. It should be noted that the materials suggested are only examples, and the present invention is not limited to the examples provided.

As described above, embodiments of the present invention include a multiple zone continuous or discontinuous undercut that allows the upflow of material to be captured while still allowing a sealant or large ID (inner diameter) washer to be applied to the fastener to create a watertight joint. For multizone continuous undercuts each zone has a different undercut depth. The multizone discontinuous undercuts may have the same or different depths.

Thus, the invention described herein includes a multiple zone undercut head design for thread forming and hole forming fasteners comprising a primary annular undercut zone closest to the shank of the fastener with an adjacent continuous or discontinuous undercut zone(s) with a shank originating at the head of the fastener with a threaded region defined, an optional tapered thread region adjacent to full size threaded region, terminating in a hole forming tip.

Embodiments of the invention also include the head of the fastener having two or more undercuts that may be adjacent and continuous or separate and discontinuous. In certain embodiments of the continuous undercut design, the adjacent undercut zones are of different depths. Also, any of the multiple undercut zones may taper in depth radially from the central axis of the fastener. Further, any of the multiple undercut zones may terminate with edges perpendicular to the deepest point of the undercut.

In certain embodiments, the subsequent radially outer undercut zones may have a deeper depth than the initial, radially inner, undercut. However, in other embodiments, the subsequent radially outer undercut zones may have a shallower depth than the initial, radially inner, undercut.

In certain embodiments, a rubber or similar sealing material, whether common or proprietary, may be applied to any of the undercut zones. Alternatively, a crush washer or O-ring may be positioned in any of the undercut zones.

In some embodiments, the threaded region is polygonal, round, or a combination of the two. Further, the cross-section of the hole forming tip may be round, polygonal, or a combination of the two. Additionally, the hole forming tip of the fastener may be composed of a single radius, or of a polynomial geometry or a combination of two or more radiused or polynomial geometric sections.

We claim:

1. A thread-forming and hole-forming fastener comprising:
    an elongated shaft extending between a first shaft end and a second shaft end, wherein the elongated shaft includes a tip provided at the first shaft end, wherein the tip is configured and arranged to create a hole by softening material of a workpiece, and a thread region provided between the tip and the second shaft end;
    a head arranged at the second shaft end, wherein the head includes a drive region that is configured and arranged to receive a rotary driving force;
    a plurality of annular undercut areas, including a first annular undercut area provided in an underside surface of the head, wherein the first annular undercut area is configured and arranged to receive material that has flowed from a substrate during installation of the fastener into the substrate, and a second annular undercut area provided in the underside surface of the head, wherein the second annular undercut area is located radially outwardly of the first annular undercut area; and
    an annular sealing member provided within the second annular undercut area, wherein the annular sealing member is configured and arranged to make sealing contact with an upper surface of the substrate,
    wherein the annular sealing member provided within the second annular undercut area is located radially outside of the first annular undercut area prior to the fastener being installed, and further wherein the fastener is adapted to be installed into a substrate to thereby define an installed state in which the material of the substrate has flowed into the first annular undercut area, while the annular sealing member remains in place, with respect to the radial direction, within the second undercut area; and
    further wherein:
        the first annular undercut area is composed of a first groove; and
        the second annular undercut area is composed of a second groove.

2. The thread-forming and hole-forming fastener according to claim 1, wherein the first annular groove and the second annular groove are formed adjacent to each other, without an annular gap between a radially outer edge of the first annular groove and a radially inner edge of the second annular groove.

3. The thread-forming and hole-forming fastener according to claim 2, wherein:
    the first annular groove extends from the underside surface to define a first depth;
    the second annular groove extends from the underside surface to define a second depth; and
    the first depth is larger than the second depth.

4. The thread-forming and hole-forming fastener according to claim 2, wherein:
    the first annular groove defines a first annular base that is concavely curved, when considered in cross-section; and
    the second annular groove defines a second annular base that is concavely curved, when considered in cross-section.

5. The thread-forming and hole-forming fastener according to claim 2, wherein the volume of the first groove is larger than the volume of the second groove.

6. The thread-forming and hole-forming fastener according to claim 1, wherein the annular sealing member is comprised of soft compressible resin sealant.

7. The thread-forming and hole-forming fastener according to claim 6, wherein the annular sealing member extends axially away from the underside surface of the head in a convex manner, when considered in cross-section.

8. The thread-forming and hole-forming fastener according to claim 1, wherein the volume of the first annular undercut area is larger than the volume of the second annular undercut area.

9. The thread-forming and hole-forming fastener according to claim 1, wherein the volume of the first groove is larger than the volume of the second groove.

10. The thread-forming and hole-forming fastener according to claim 1, wherein the tip of the elongated shaft comprises a sharp point.

11. The thread-forming and hole-forming fastener according to claim 1, wherein the tip of the elongated shaft comprises a rounded end.

12. The thread-forming and hole-forming fastener according to claim 1, wherein the first annular groove and the second annular groove are formed with an annular gap between a radially outer edge of the first annular groove and a radially inner edge of the second annular groove.

13. The thread-forming and hole-forming fastener according to claim 1, wherein the first annular undercut area and the second annular undercut area are formed without an annular gap between a radially outer edge of the first annular undercut area and a radially inner edge of the second annular undercut area.

14. A thread-forming and hole-forming fastener comprising:
an elongated shaft extending between a first shaft end and a second shaft end, wherein the elongated shaft includes a tip provided at the first shaft end, wherein the tip is configured and arranged to create a hole by softening material of a workpiece, and a thread region provided between the tip and the second shaft end;
a head arranged at the second shaft end, wherein the head includes a drive region that is configured and arranged to receive a rotary driving force;
a plurality of annular undercut areas, including a first annular undercut area provided in an underside surface of the head, wherein the first annular undercut area is configured and arranged to receive material that has flowed from a substrate during installation of the fastener into the substrate, and a second annular undercut area provided in the underside surface of the head, wherein the second annular undercut area is located radially outwardly of the first annular undercut area; and
an annular sealing member provided within the second annular undercut area, wherein the annular sealing member is configured and arranged to make sealing contact with an upper surface of the substrate, and
wherein the second annular undercut area includes an axially extending annular wall and a radially extending annular wall, with a right angle defined therebetween, when considered in cross-section.

15. The thread-forming and hole-forming fastener according to claim 14, wherein the radially extending annular wall defines a plane that extends perpendicular to an axis of the elongated shaft, where the axis extends between the first shaft end and the second shaft end.

16. The thread-forming and hole-forming fastener according to claim 15, wherein the axially extending annular wall extends in a direction that is parallel to the axis of the elongated shaft.

17. The thread-forming and hole-forming fastener according to claim 14, wherein the annular sealing member is comprised of an elastomeric material.

18. The thread-forming and hole-forming fastener according to claim 14, wherein the annular sealing member is comprised of an O-ring.

19. The thread-forming and hole-forming fastener according to claim 18, wherein the O-ring is formed of an elastomeric material.

20. The thread-forming and hole-forming fastener according to claim 14, wherein the annular sealing member is comprised of a crush washer.

21. The thread-forming and hole-forming fastener according to claim 20, wherein the crush washer is formed of a soft metal or a soft metal alloy.

22. A thread-forming and hole-forming fastener comprising:
an elongated shaft extending between a first shaft end and a second shaft end, wherein the elongated shaft includes a tip provided at the first shaft end, wherein the tip is configured and arranged to create a hole by softening material of a workpiece, and a thread region provided between the tip and the second shaft end;
a head arranged at the second shaft end, wherein an upper surface of the head includes a drive region that is configured and arranged to receive a rotary driving force;
a plurality of annular undercut areas, including a first annular undercut area provided in an underside surface of the head, wherein the first annular undercut area is configured and arranged to receive material that has flowed from a substrate during installation of the fastener into the substrate, and a second annular undercut area provided in the underside surface of the head, wherein the second annular undercut area is located radially outwardly of the first annular undercut area; and
an annular sealing member provided within the second annular undercut area, without extending to the upper surface of the head, and radially outside of the first annular undercut area, wherein the annular sealing member is configured and arranged to make sealing contact with an upper surface of the substrate, and
wherein the annular sealing member is comprised of soft compressible resin sealant.

* * * * *